Nov. 6, 1928.

F. STEBLER

FRUIT COUNTING APPARATUS

Filed Feb. 2, 1925

Inventor
Fred Stebler
By Lyon & Lyon
Attorneys

Nov. 6, 1928.  
F. STEBLER  
1,690,756  
FRUIT COUNTING APPARATUS  
Filed Feb. 2, 1925  
5 Sheets-Sheet 2

Inventor  
Fred Stebler  
By Lyon & Lyon  
Attorneys

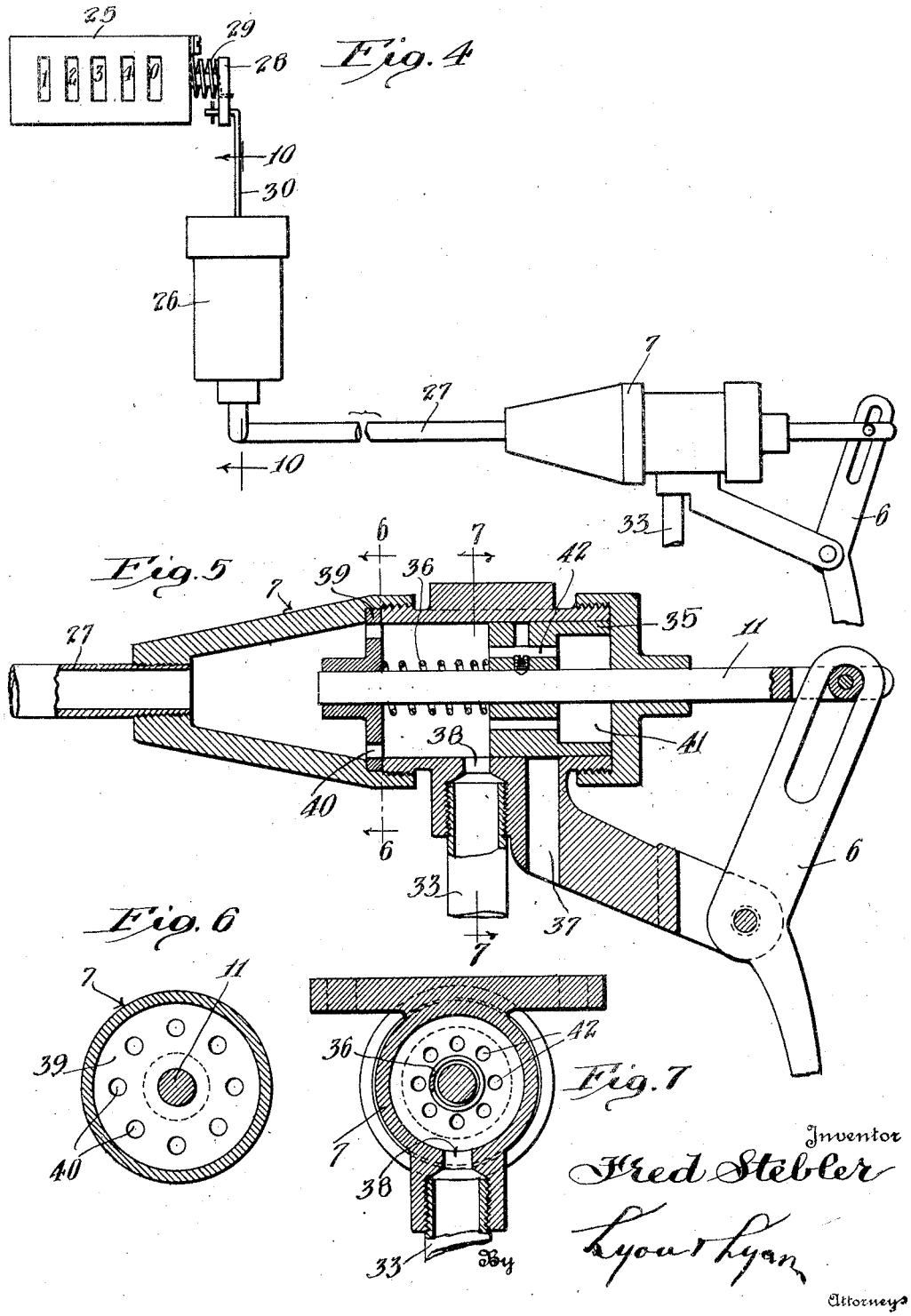

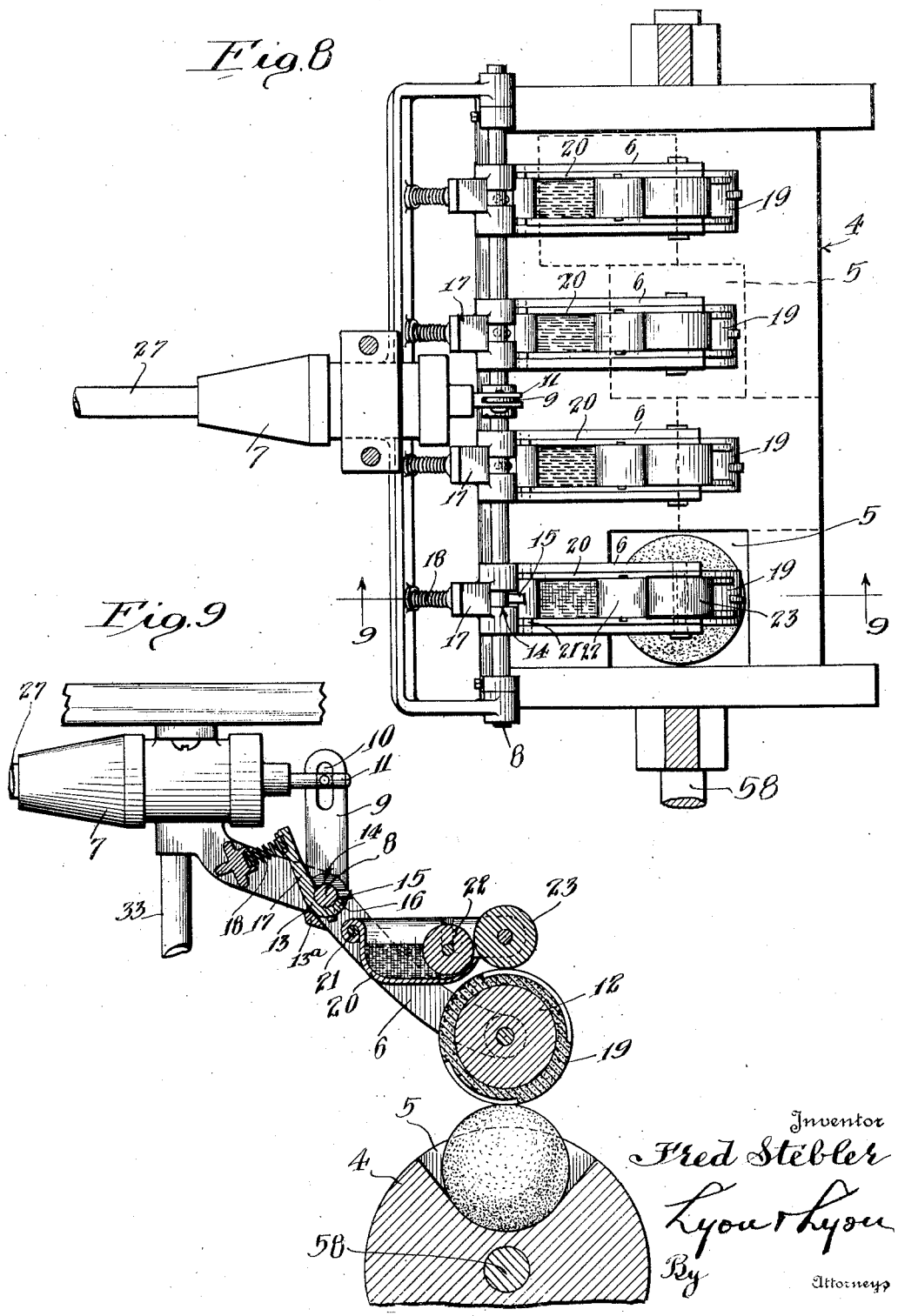

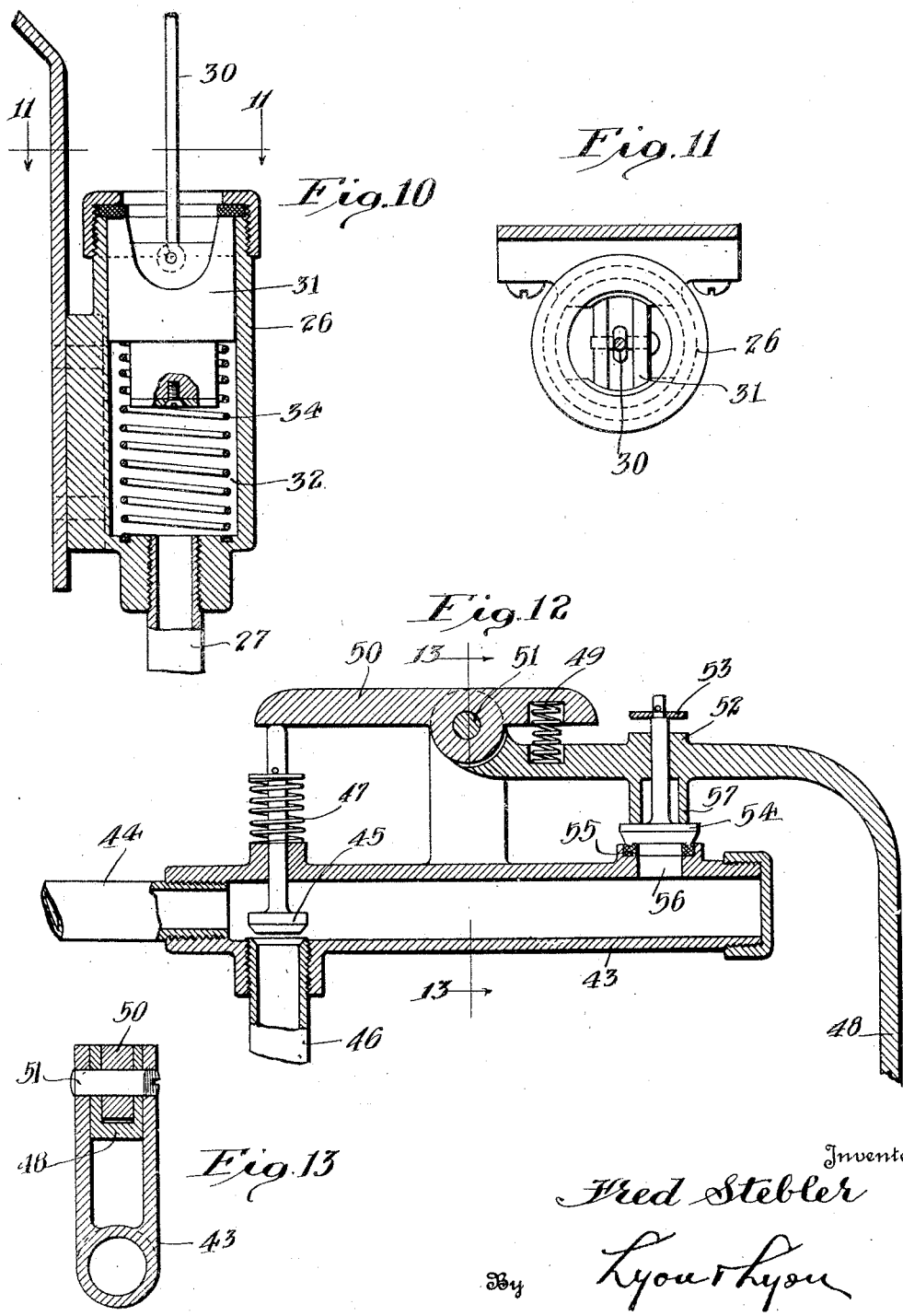

Patented Nov. 6, 1928.

1,690,756

UNITED STATES PATENT OFFICE.

FRED STEBLER, OF RIVERSIDE, CALIFORNIA, ASSIGNOR TO STEBLER-PARKER CO., OF RIVERSIDE, CALIFORNIA, A CORPORATION OF CALIFORNIA.

FRUIT-COUNTING APPARATUS.

Application filed February 2, 1925. Serial No. 6,325.

This invention relates to counting apparatus, and while features of the invention are capable of use in counting apparatus for various purposes, in the specification I have described the invention as applied to an apparatus for counting citrus fruit. It is the practice to sort or grade the fruit into different sizes and the fruit of the different sizes are preferably all counted preparatory to packing. The general object of the invention is to provide apparatus for rapidly counting a multiplicity of different sizes of fruit and also to construct the apparatus in such a way that the counters are actuated by the passing fruit.

In the embodiment of the invention described herein, I provide movable carriers having pockets for the fruit, but the counters are not actuated by the movement of the carriers; they are actuated by the fruit carried in the pockets. In this way, if a pocket passing the actuating lever at the point where the fruit is counted is empty, the counter will not be actuated.

A further object of the invention is to provide a counting apparatus in which the counters can be assembled at a common indicating station, for example, in a group at the end of the apparatus, and to provide simple means for actuating the counters from the point where the fruit passes.

The invention is especially applicable to use in conjunction with sizing apparatus in which the different sizes of fruit are collected in receivers corresponding to each size. In the operation of such a sizing apparatus, the variation in sizes of the fruit may result in distributing the fruit at varying rates, and may deliver a relatively great number of fruit of one size in a comparatively short time into one of the receivers, which would ordinarily overtax the capacity of ordinary single acting counting apparatus. One of the objects of my invention is to provide for this contingency and to produce a counting apparatus having a relatively large capacity at each receiver. Another object is to provide means for marking the fruit at the point where it actuates the counter.

Further objects of the invention will appear hereinafter. The invention consists in the novel parts and combination of parts to be described hereinafter, all of which contribute to produce an efficient fruit counting apparatus.

A preferred embodiment of the invention is described in the following specification, while the broad scope of the invention is pointed out in the appended claims.

In the drawings:

Fig. 4 is a diagrammatic view illustrating a counter, together with pneumatic apparatus for actuating it.

Fig. 5 is a vertical section through the pneumatic valve shown in Fig. 4, but upon an enlarged scale.

Fig. 6 is a vertical cross section taken on the line 6—6 of Fig. 5 and illustrating details of the construction of the pneumatic valve.

Fig. 7 is a cross section taken on the line 7—7 of Fig. 5.

Fig. 8 is a plan showing one of the carriers for taking the fruit from the receivers and illustrating the mechanism through which the fruit effects the actuation of the counters, and also illustrating the means for marking the fruit.

Fig. 9 is a vertical section taken about on the line 9—9 of Fig. 8, certain parts being broken away.

Fig. 10 is a longitudinal section taken about on the line 10—10 of Fig. 4 and particularly illustrating details of a pneumatic actuator which I employ to actuate the counter.

Fig. 11 is a horizontal section taken about on the line 11—11 of Fig. 10 and further illustrating details of the actuator.

Fig. 12 is a longitudinal section through a pneumatic valve apparatus which I may employ which may be used to perform the function of the pneumatic valve shown in Fig. 5.

Fig. 13 is a vertical section taken on the line 13—13 of Fig. 12.

In practicing my invention, I provide a movable carrier having pockets to receive the fruit, and adjacent to this carrier I provide a movable member which is actuated by the fruit as it passes; this movement caused by the fruit effects the actuation of the counters. I also prefer to provide means for marking the fruit as it passes this point on the movable carrier. When the invention is applied to a sizing apparatus, I provide a movable carrier corresponding to each receiver which carries the fruit of a certain size, and I group the counters at the end of the apparatus. I also provide means for actuating the counters from the fruit carried in the pockets of the movable carriers.

Figure 1:
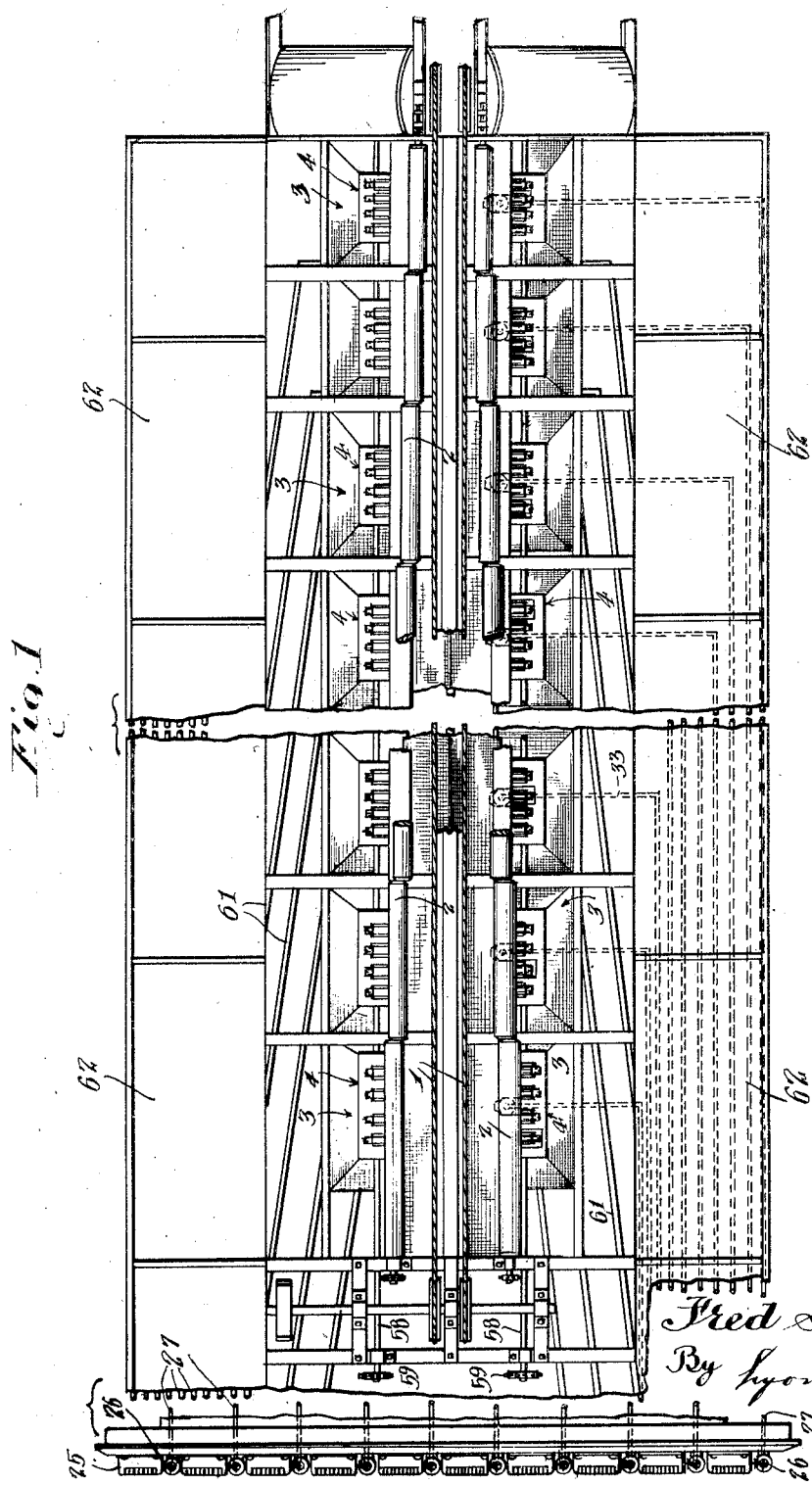
Fig. 1 is a plan of a fruit sizing apparatus embodying my invention; the middle portion of this figure is broken away.
Figure 2:
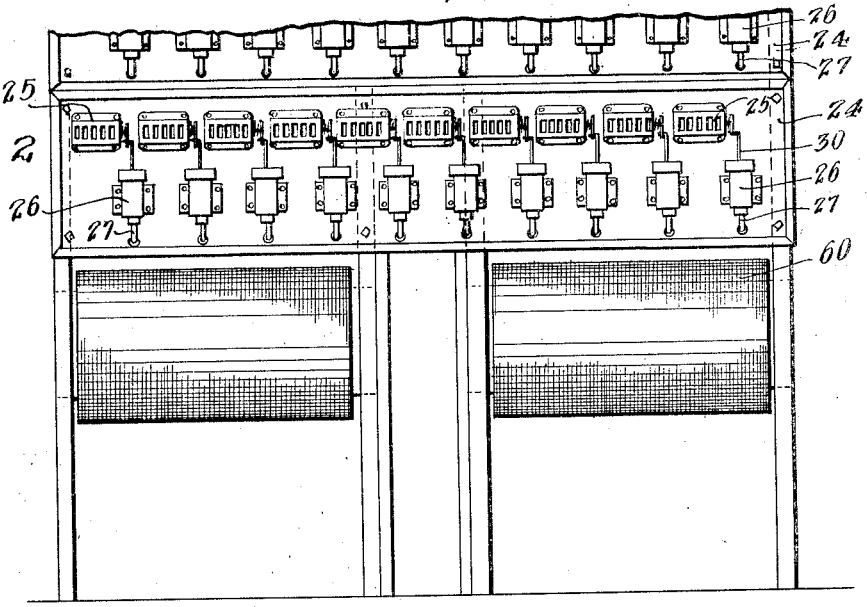
Fig. 2 is an elevation broken away, showing the indicator boards preferably located at the left end of the apparatus shown in Fig. 1, and indicating the manner in which I group all of the counters at one point.
Figure 3:
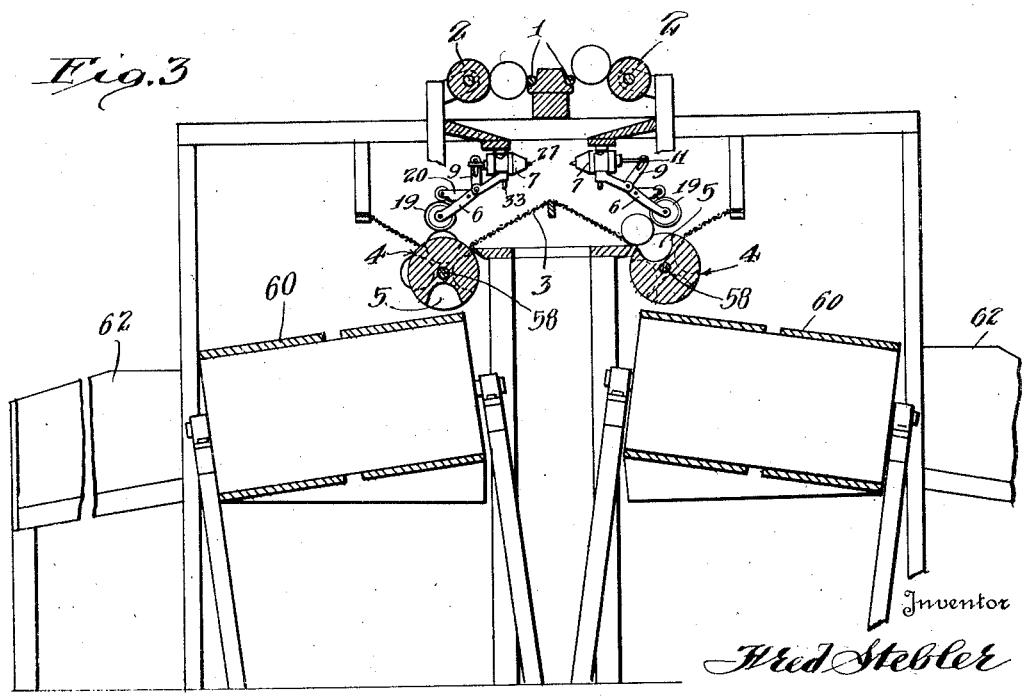
Fig. 3 is a vertical section through the apparatus shown in Fig. 1 and particularly illustrating details of the construction of the carriers and the means for actuating the counters. This is a typical section and shows the apparatus in section, as though looking toward the left of Fig. 1.

I shall now describe the invention as applied to a fruit sizing apparatus having a plurality of receivers for the fruit of different sizes. The sizing apparatus may be of any construction operating to sort the fruit and effect its delivery into different receivers corresponding to the sizes of the fruit. As shown in Figures 1 and 2, this sizing apparatus includes a pair of parallel endless cords 1, each cord cooperating with sizing rollers 2 which are disposed in a stepped arrangement gradually increasing the gap between the cord or rope and the roller. The fruit proceeds along the sizer from the right end, as viewed in Fig. 1. At each roller fruit of a certain diameter will fall through into a receiver 3, which preferably has a bottom of cloth or similar material which will prevent injury to the fruit when it falls from the sizing gap. In this way, the fruit of different sizes are collected in the different receivers, the receivers being disposed in a row on each side of the apparatus.

Corresponding to each receiver I provide a movable carrier and each carrier is preferably in the form of a rotary member in the form of a carrier or drum 4 having a plurality of fruit pockets 5, the individual fruit pockets being disposed at different points along the length of the carrier or drum, and in addition to this the pockets are displaced from each other circumferentially around the drum; in other words, they are disposed in a progressive or stepped arrangement with their central planes on radial lines from the axis of the drum. In the present instance, I have illustrated four pockets for each drum, and hence the adjacent pockets are disposed 90° apart with respect to the circumference of the drum. With this arrangement, each rotation of the drum should carry four fruits from the receiver. The receivers 3 are not always full of fruit, so that it is not possible to operate the counters to indicate the passing of four fruit for each revolution of the carrier. For this reason I provide means for actuating the counters which is operated by the fruit carried in the pocket, and I prefer to provide gangs of movable members, such as levers, any one of which will actuate a common controlling device located at the receiver, the actuation of the controlling device operating to effect the advance of the corresponding counter on the indicator board at the end of the apparatus.

Referring especially to Figures 8 and 9, corresponding to each pocket 5, I provide a movable member preferably in the form of a bifurcated lever or arm 6, and corresponding to each receiver I provide a pneumatic valve 7 which is controlled in common by the arms 6. In order to accomplish this, I mount a rock shaft 8 which extends substantially parallel with the axis of the drum or rotary member 4, and this rock shaft has a rigid arm 9 connected by a pin-and-slot connection 10 with the stem 11 of the pneumatic valve 7. Each arm 6 is loosely mounted on the rock shaft 8, but at its point of connection to the rock shaft is provided with means for rotating the rock shaft when the fruit engages a wheel 12 mounted on the end of the arm.

For this purpose, the hub 13 of each arm 6 is provided with a slot 14 which receives a radial pin 15 rigid on the shaft. When the arm 6 is rocked up by the fruit, the edge 16 of this slot engages the pin and rocks the arm 9 toward the left, as viewed in Fig. 9, and this operates the stem 11 of the pneumatic valve. By reason of the slots 14, it will be evident that any one of the arms 6 can actuate the rock shaft independently of the others. It is necessary, however, that the arms 6 shall be actuated at different times, and this is the reason why I displace the pockets circumferentially from each other on the drum. Each arm 6 is provided with a tail arm 17 with a spring 18 for normally holding the arm 6 against a stop-bar 13ᵃ; so each arm is held in its normal or depressed position, and these arms hang in this position until raised by the fruit passing the arm.

The wheel 12 is preferably constructed as a marking wheel so that the counting and marking of the fruit is combined in one operation. For this purpose, the wheel 12 is provided with a marking band 19 which encircles it and suitable means is provided for supplying a marking fluid or ink to this band. For this purpose I provide an ink cup 20 supported on a pivot 21 between the forks of the bifurcated arm 6, and provided with a wallower 22 which dips into the ink, and the face of which carries the ink to a distributor wheel 23 which rolls on the face of the marking rim 19. In this construction, the weight of the cup and its attached parts presses the distributor wheel 23 on the upper face of the marking wheel. The name or other mark to be carried by the marking rim 19 occurs a number of times in the circumference of the marking wheel, so as to insure that the fruit will be distinctly marked.

At one end of the apparatus I provide a common indicating station for all the indicators, including indicator boards 24 (see Figure 2) and each board carries a counter 25 to correspond with each receiver 3. The counters are controlled by a control system common to all the counters. Each counter is actuated by an actuator 26 preferably of pneumatic type, and each of these actuators 26 is connected by a pneumatic connection 27 with its corresponding pneumatic valve 7.

Referring to Fig. 4, each counter 25 is of a common type operated by a lever 28. In the operation of counters of this type, the lever 28 is pulled in one direction and then let go, being returned to its normal position by a spiral spring 29 associated with the lever. To this lever 28 I attach the stem 30 of the actuator 26, and this stem constitutes a piston rod pivotally attached to a piston 31 (see Fig. 10), the actuator being in the form of a cylinder or barrel in which this piston 31 reciprocates. It should be understood, however, that in Fig. 10 this piston 31 is shown in an abnormal position. In other words, when the apparatus is at rest, this piston 31 should be at the lower end of the cylinder, as viewed in Fig. 10. This piston is normally held in this position by reason of the fact that I create a partial vacuum in the vacuum chamber 32, in the lower end of the actuator barrel; for this purpose this chamber is connected with a pneumatic pipe connection 27. In the normal position of the pneumatic valve 7, this pipe connection 27 is in communication with a pipe connection 33 which leads to an exhaust or suction device, not illustrated. With this organization of apparatus, the actuator 26 holds the lever 28 in a position as though half of the movement has been effected to operate the counter. By releasing the vacuum which is normally maintained in the pipe 27, the spring 29 will move the lever over. In some counters this may actuate the dials of the counter; in others these dials may be advanced by the return stroke of the lever 28, it being understood, of course, that as soon as the partial vacuum exists again in the pipe 27, the piston 31 will return to the bottom end of the actuator. If desired, a spring 34 may be provided in the barrel of the actuator to assist the operation of the spring 29.

The pneumatic valve 7 is preferably constructed so that in operation it cuts off communication from the pipe 33 to the suction device before it admits atmospheric pressure to the actuator 26. This valve may be of the type shown in Fig. 5, in which the stem 11 of the valve is provided with a piston 35 which is normally held by a spring 36 in a position to cover a port 37 leading to the atmosphere; in this position the piston leaves the port 38 uncovered, which communicates with the pipe connection 33; a fixed head 39 in the left end of the valve is provided with ports 40 which maintain communication from the pipe 33 to the pipe 27. When the stem 11 is shoved in through the agency of the passing fruit, the piston 35 moves to the left and immediately closes the port 38. This cuts off communication to to suction device and the further movement of the piston eventually uncovers the port 37 which effects communication between the atmosphere and the chamber 41 in the right end of the valve. This chamber 41 is constantly in communication with the left end of the barrel of the valve through the ports 42 in the piston; hence as soon as the port 37 is uncovered by the piston, atmospheric pressure will be developed in the pipe 27 and communicated to the lower end of the actuator 26, whereupon the spring 29 will swing the lever 38 in one direction. After the fruit has passed, the piston valve 35 will move back to the position in which it is shown in Fig. 5, and this will reinstate the partial vacuum existing in the pipe 27 and will hold the piston 31 down to its normal position and thereby impart the remainder of the movement to the lever 28. That is to say, the cycle of movement of this lever 28 will now be completed.

In Fig. 12 I have illustrated another type of pneumatic valve apparatus for controlling the counters. In this type of valve apparatus the body 43 of the device is of tubular form, one end being connected with a pipe 44 corresponding to the pipe 27 and connected to the actuator; at the end of the body 43 adjacent to the pipe connection 44 a suction valve 45 is provided which may seat on the end of a pipe connection 46 leading from the suction device; this valve is normally held off its seat by a spring 47. In this type of apparatus, when a lever 48 is raised by the passing fruit, a spring 49 communicates the movement to a rock lever 50 mounted on a rock shaft 51, and this lever pushes down on the stem of the valve 45. The lever 48 is mounted to rock on the same rock shaft 51. The first part of the movement of the lever 48 immediately closes the valve 45, but after the lever 48 is moved a short distance, a boss 52 upon it engages a collar 53 on the stem of the atmospheric valve 54 and raises this valve from its seat 55, thereby admitting atmospheric pressure through a port 56 into the right end of the tubular body 43. A tubular extension 57 on the under side of the lever 48 normally engages the upper side of the valve 54 and holds it on its seat.

In practice, if desired, all of the carriers or drums 4 may be mounted upon a common shaft 58 which extends longitudinally of the apparatus, and which may be driven by a sprocket wheel 59 on the end of the shaft.

The counted and marked fruit is delivered on the endless belts 60 which run longitudinally of the apparatus, and these belts move the fruit along between the guide rails 61 so as to deliver the different sizes into corresponding bins 62 at each side of the apparatus.

In the operation of the apparatus, the fruit moves with the sizing cords 1 from the right to the left, as viewed in Fig. 1, the rollers 2 cooperating with the cords to sort the fruit into sizes and permit the same to descend into corresponding receivers 3. As the carriers or drums 4 rotate, their pockets 5 take the fruit and guide it past the levers 6, bringing the fruit into engagement with the marking wheels 12. As each wheel 12 is engaged by the fruit, it rotates sufficiently to effect the marking of the fruit and also causes an upward movement of the arm or lever 6. This actuates the rock shaft 8 and moves the controlling device 7 which effects the operation of the corresponding actuator 26 in the manner described above.

It is understood that the embodiment of the invention described herein is only one of the many embodiments this invention may take, and I do not wish to be limited in the practice of the invention, nor in the claims, to the particular embodiment set forth.

What I claim is:

1. In fruit counting apparatus, the combination of a rotary member having a plurality of pockets, the individual pockets being disposed at different points along the length of the rotary member, and displaced from each other circumferentially, a shaft extending substantially parallel with the axis of the rotary member, a plurality of arms mounted on the said shaft and respectively in alignment with the pockets, whereby the fruit carried in the pockets will move the arms, means for supplying fruit to all the pockets as they rotate, and a counting device actuated by all of the arms.

2. In fruit counting apparatus, the combination of a rotary member having a plurality of fruit pockets, the individual pockets being disposed at different points along the length of the rotary member, and displaced from each other circumferentially, a rock shaft extending substantially parallel with the axis of the rotary member, a plurality of arms mounted on the rock shaft and respectively in alignment with the pockets so that the fruit carried in the pockets will move the arms, each arm having means for rotating the rock-shaft, a counter, a lever carried by the rock-shaft and means actuated thereby for controlling the counter.

3. In a counting device having a supporting surface of a width to hold a plurality of articles in a transverse row and along which the articles to be counted pass, a rotary member disposed at the end of and projecting above said surface and provided with a plurality of pockets longitudinally spaced and peripherally offset about the rotary member, whereby the articles received in the pockets will be disposed in offset relation, a plurality of movable members supported in the path of movement of the articles and adapted to be actuated thereby, and a register actuated upon the movement of any one of said members.

4. In a counting device, the combination of a receiver for articles to be counted and a rotary carrier having a plurality of pockets disposed along the carrier and displaced from each other circumferentially, a counter, and a plurality of movable arms mounted above the pockets and each adapted to be successively actuated by an article in a pocket, to actuate the counter.

5. In a fruit counting apparatus the combination with counting means of a rotary member having a plurality of pockets for the fruit, the individual pockets being disposed at different points along the rotary member and displaced from each other circumferentially, and means extending over the pockets in the path of the fruit in the pockets for actuating the counting means.

Signed at Los Angeles, California, this 16th day of January, 1925.

FRED STEBLER.